(12) United States Patent
Panchal

(10) Patent No.: US 12,636,821 B2
(45) Date of Patent: May 26, 2026

(54) MULTIVARIATE SHRINKAGE SENSOR (MVSS) FOR INJECTION MOLDING

(71) Applicant: Leonine Technologies, Lindenhurst, IL (US)

(72) Inventor: Rahul R. Panchal, Brookline, NH (US)

(73) Assignee: Leonine Technologies Inc., Bloomington, MN (US)

( * ) Notice: Subject to any disclaimer, the term of this patent is extended or adjusted under 35 U.S.C. 154(b) by 162 days.

(21) Appl. No.: 18/761,084

(22) Filed: Jul. 1, 2024

(65) Prior Publication Data

US 2024/0351260 A1     Oct. 24, 2024

Related U.S. Application Data

(63) Continuation of application No. 17/318,951, filed on May 12, 2021, now Pat. No. 12,023,836.

(60) Provisional application No. 63/024,060, filed on May 13, 2020.

(51) Int. Cl.
 B29C 45/76 (2006.01)
 B29C 45/77 (2006.01)
 B29C 45/78 (2006.01)
 B29C 45/80 (2006.01)

(52) U.S. Cl.
 CPC ............ B29C 45/768 (2013.01); B29C 45/77 (2013.01); B29C 45/78 (2013.01); B29C 45/80 (2013.01); B29C 2945/76006 (2013.01); B29C 2945/7604 (2013.01); B29C 2945/76096 (2013.01); *B29C 2945/76103* (2013.01); *B29C 2945/76458* (2013.01); *B29C 2945/76481* (2013.01); *B29C 2945/76488* (2013.01)

(58) Field of Classification Search
 None
 See application file for complete search history.

(56) References Cited

U.S. PATENT DOCUMENTS

2011/0101555 A1* 5/2011 Kazmer ................. B29C 45/76
                                                              264/40.6
2014/0035563 A1* 2/2014 Tan ........................ G05B 15/02
                                                              324/207.2

* cited by examiner

*Primary Examiner* — Jacob T Minskey
*Assistant Examiner* — Adrien J Bernard
(74) *Attorney, Agent, or Firm* — Armis IP Law, LLC

(57)     ABSTRACT

A shrinkage detection device for a polymer injection molding apparatus detects a shrinkage experienced by an injection molded element for assessing a quality of the molded element. Shrinkage, along with temperature and pressure of the melt within the mold during cooling, indicates a sufficiency of the resulting molded element for intended purposes. Sufficiency includes parameters such as flexibility, shear strength and longevity, and is accurately performed can replace conventional sample testing of molded articles that are expensive and time consuming.

17 Claims, 10 Drawing Sheets

Part shrinks as it cools - the pressure decays and sensor pin moves forward 50-2

50-1

133

100

Melt contacts and exerts pressure on the sensor pin- Sensor pin moves backward 50-2

50-1

415

100

MULTIVARIATE SHRINKAGE SENSOR (MVSS) FOR INJECTION MOLDING

RELATED APPLICATIONS

This patent application is a continuation under 35 U.S.C. § 120 of U.S. patent application Ser. No. 17/318,951, filed May 12, 2024, entitled "MULTIVARIATE SHRINKAGE SENSOR (MVSS) FOR INJECTION MOLDING" which claims the benefit under 35 U.S.C. § 119(e) of U.S. Provisional Patent App. No. 63/024,060, filed May 13, 2020, entitled "MULTIVARIATE SHRINKAGE SENSOR (MVSS) FOR INJECTION MOLDING" incorporated herein by reference in entirety.

STATEMENT REGARDING FEDERALLY SPONSORED RESEARCH AND DEVELOPMENT

This invention was made, at least in part, with government support under Grant Nos. 1822271,02-045309, CMMI-1000816/1000551, 1843921, awarded by the National Science Foundation. The Government has certain rights in the invention.

BACKGROUND

Injection molding is a common manufacturing approach for low-cost, high volume articles formed from a variety of polymers. A pelletized stock is typically distributed in bulk and delivered to molding machines for high pressure injection of molten feedstock into a specially prepared mold having the desired form. A screw or impeller typically forces the feedstock in conjunction with heat to generate the high pressure, fluid melt that fills even complex mold shapes.

SUMMARY

An injection molding multivariate sensor captures and computes shrinkage, temperature and pressure parameters associated with an injection molded article, and computes a validation based on the gathered parameters to indicate whether the molded article surpasses a minimal sufficiency. The gathered parameters include a displacement of a plunger or sliding pin responsive to in-mold shrinkage and measured by a magnetic medium in conjunction with pressure and temperature. An analysis application receives the parameters for computing molded article sufficiency at molding time rather than after post-molding inspections, providing time and cost advantages.

Configurations herein are based, in part, on the observation that injection molding provides an economic alternative to manufacturing of elements formerly performed by metal working, stamping and casting. Polymer pellet stock loaded into a hopper feeds a screw or threaded injector that agitates, forces and heats the pellet stock into a viscous molten form (melt). The screw also forces the viscous melt at substantial pressure into a cavity of a mold having the shape of the desired molded element. The forced melt fills the mold by flowing into the various voids and contours in the mold. Unfortunately, conventional approaches to injection molding suffer from the shortcoming that imperfections in molded articles can result from variations in viscosity, temperature and pressure of the molten polymer during injection into the cavity defining the mold.

As the molten polymer cools inside the cavity, shrinkage occurs. The magnitude and rate of shrinkage, along with the temperature and pressure, indicates a sufficiency of the molded article. Configurations herein substantially overcome conventional approaches to assessing the sufficiency of injection molded articles from an integrated shrinkage, pressure and temperature sensor that tracks these parameters during cooling and computes a sufficiency measure of the resulting molded article.

An in-mold shrinkage detection sensor device for injection molding includes a plunger or rod in communication with a cavity defined by a mold volume interior. The plunger has a distal end in communication with the cavity and a proximate end having an magnetic source. A digital position sensor adjacent to a travel path of the magnetic source is responsive to the magnetic source for detecting a movement of the plunger based on displacement of the distal end caused by shrinkage of the melt. Upon injection, the pressure of the melt forces the plunger out of the cavity, and as the melt cools, the volume contracts and draws the spring loaded plunger slightly back within the cavity. A typical range of travel may be on the order of 0.5 mm.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The description below presents an example of an injection molding environment using the multivariate shrinkage sensor (sensing element, hereinafter) in conjunction with an injection molding system for monitoring shrinkage and related parameters associated with a quality of the molded article, evaluating the quality based on the gathered parameters, and recommending whether the molded article is suitable for deployment based on quality control (QC) standards. A typical molding process generally encounters a small number of inferior moldings, however the shrinkage sensing along with related parameters for temperature and the molding pressure provide an immediate quality indication of the molded product. In contrast, conventional approaches analyze samples post-molding and incur additional time and expense to evaluate and confirm a quality batch of molded articles.

Figure 1:
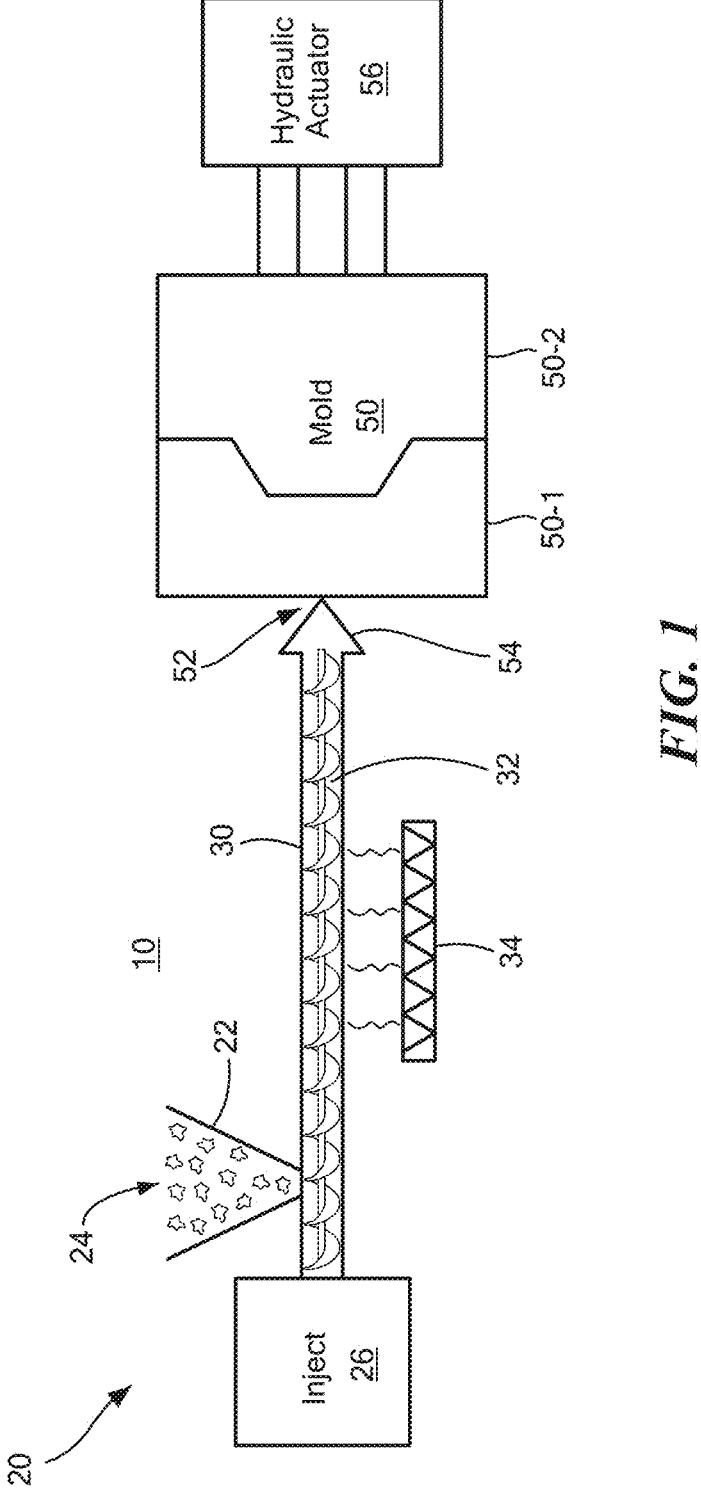
FIG. 1 is a context diagram of an injection molding production environment suitable for use with configurations herein.

FIG. 1 is a context diagram of an injection molding production environment suitable for use with configurations herein. Injection molding is most economical when a single mold can be reused for many molded units. Accordingly, an injection molding environment 10 may employ a plurality of molding machines 20. Each molding machine employs a hopper 22 for receiving a feedstock 24 of raw molding material, typically in a pellet form. A variety of polymers and plastics may be employed as the feedstock, and any suitable feedstock may be employed as described below. The hopper 22 feeds an injection tube 30 typically having a helical impeller 32 or spiral surface for directing the feedstock into a mold 50. The injection tube typically employs heaters 34 for melting or fluidizing the feedstock 24 as it is forced into the mold 50 by the impeller 32. A drive source 26 typically generates a substantial pressure of the feedstock as it travels along the injection tube 30.

At the mold 50, an injection interface 52 is in fluidic communication with the mold 50, such that the injection interface 52 defines a high pressure input to the mold and is responsive to an injector 54 for receiving a melt of molten feedstock. The melt fills a cavity in the mold for forming a molded article defined by an interior contour of the mold 50. The mold 50 may take any suitable form to correspond to the desired molded article, and is typically defined in at least two parts 50-1 . . . 50-2 such that a hydraulic actuator 56 may separate mold halves for ejection of the molded article.

Figure 2A:
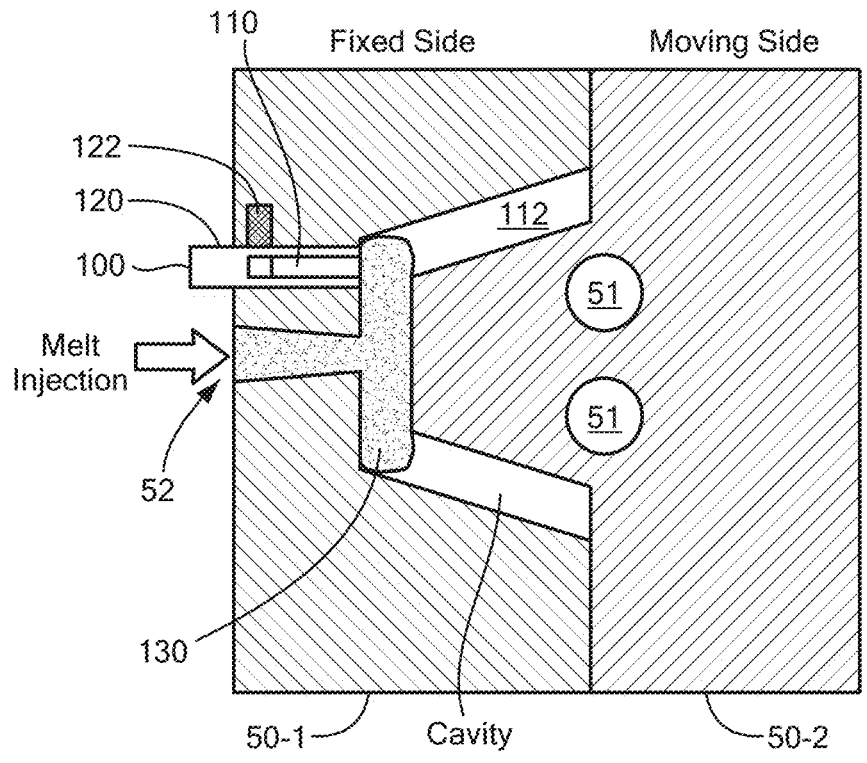
FIGS. 2A-2D shows a simplified view of a molding sequence in the environment of FIG. 1 using a multivariate shrinkage sensor as defined herein.
Figure 2B:
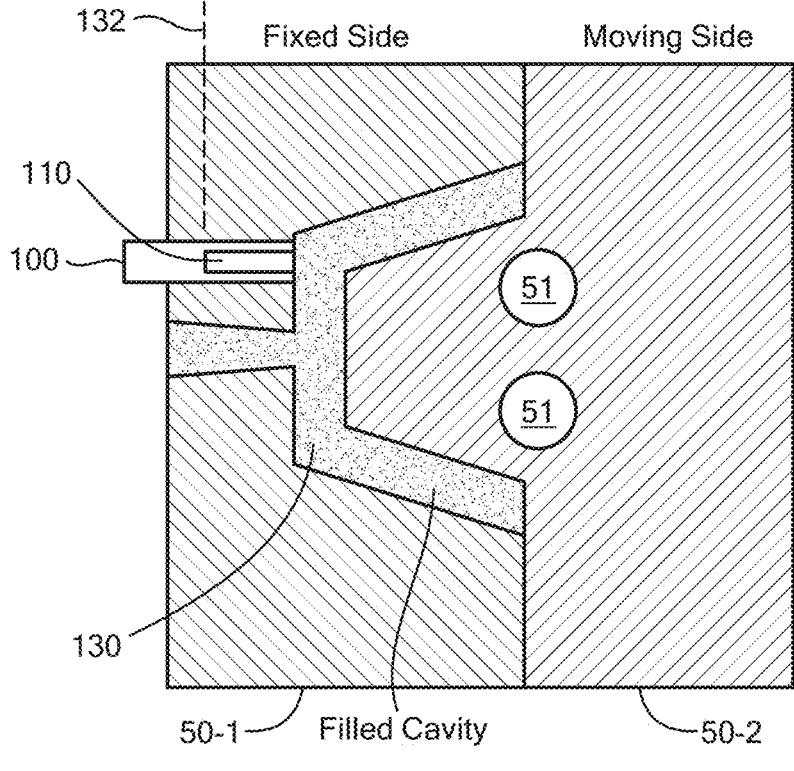
Figure 2C:
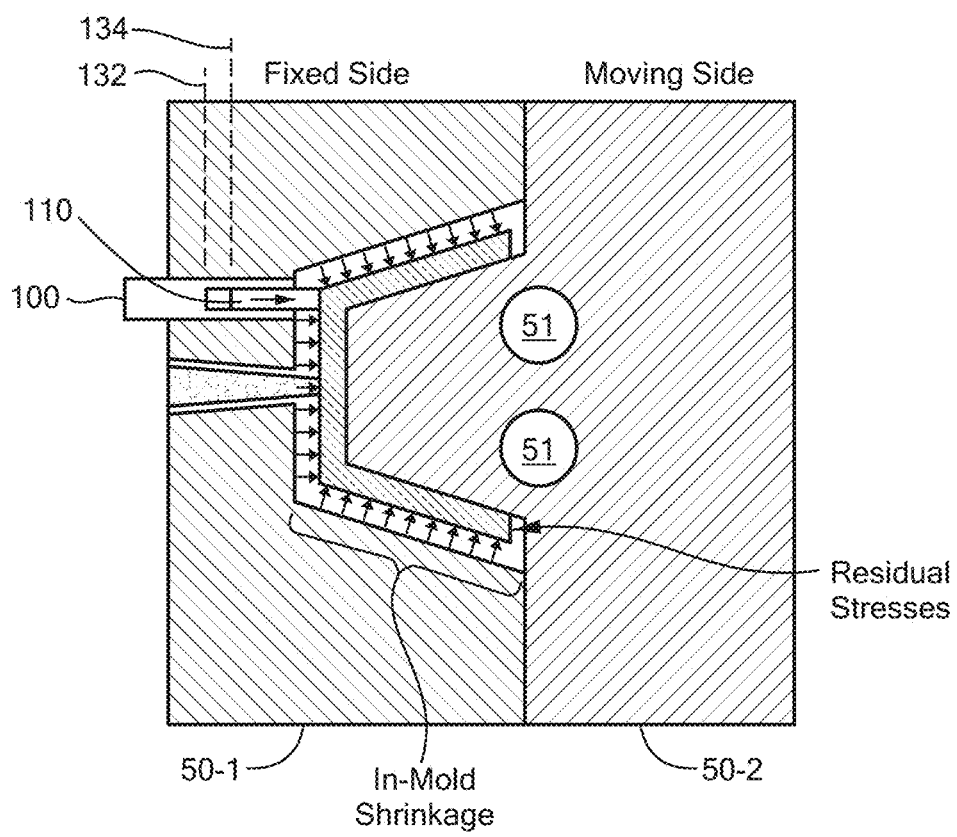
Figure 2D:
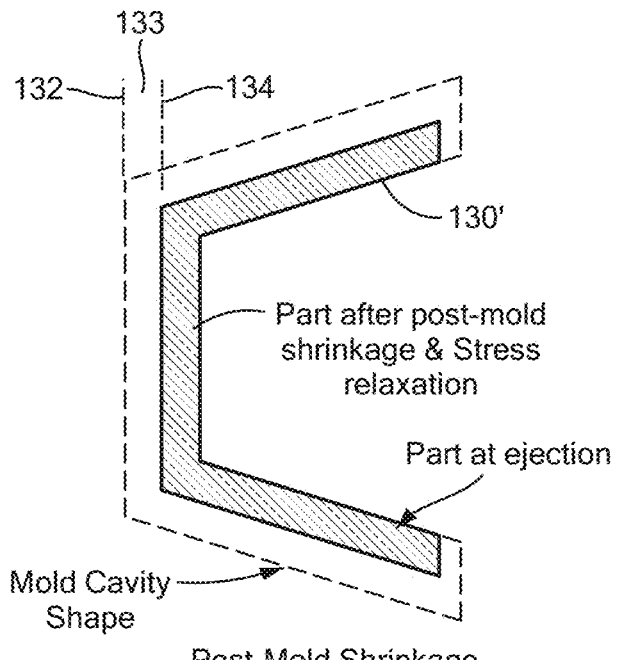

FIGS. 2A-2D shows a simplified view of a molding sequence in the environment of FIG. 1 using a multivariate shrinkage sensor element for performing quality sensing of an injection molding as defined herein. Referring to FIGS. 1-2D, the sensor element 100 includes an elongated plunger 110 in communication with a cavity 112 defined by an interior volume of a mold. The elongated plunger 110 has a distal end in communication with the cavity 112 and a proximate end responsive to a biasing force. A magnetic source 120 attaches at or near the proximate end, and a position sensor 122 is responsive to the magnetic source 120 for detecting a movement of the plunger 110 based on displacement of the distal end that results from shrinkage of an injected melt 130 contained in the cavity 112.

In FIG. 2A the melt 130 commences flowing through the injection interface 52, which may be simply a high pressure passage from the injection tube 30 of FIG. 1 for forcing the melt 130 into the mold. When filled in FIG. 2B, the elongated plunger 110 is flush with the pressurized, injected melt 112 at a depth 132 (shown from the proximate end). As the melt 112 cools and cures, shrinkage occurs which causes contraction of the melt 112 as it tends to pull away from the mold walls, shown in FIG. 2C. Cooling channels 51 also assist in temperature management. The elongated plunger 110 extends inward to the mold cavity to correspond to the shrinkage, as the molded depth 134 differs from the injection depth 132 based on the shrinkage 133, shown in FIG. 2D. The displacement of the elongated plunger computed from the difference between the injection depth and the molded depth defines the shrinkage 133 used for quality assessment of the cured, molded article 130' as discussed further below.

Figure 3:
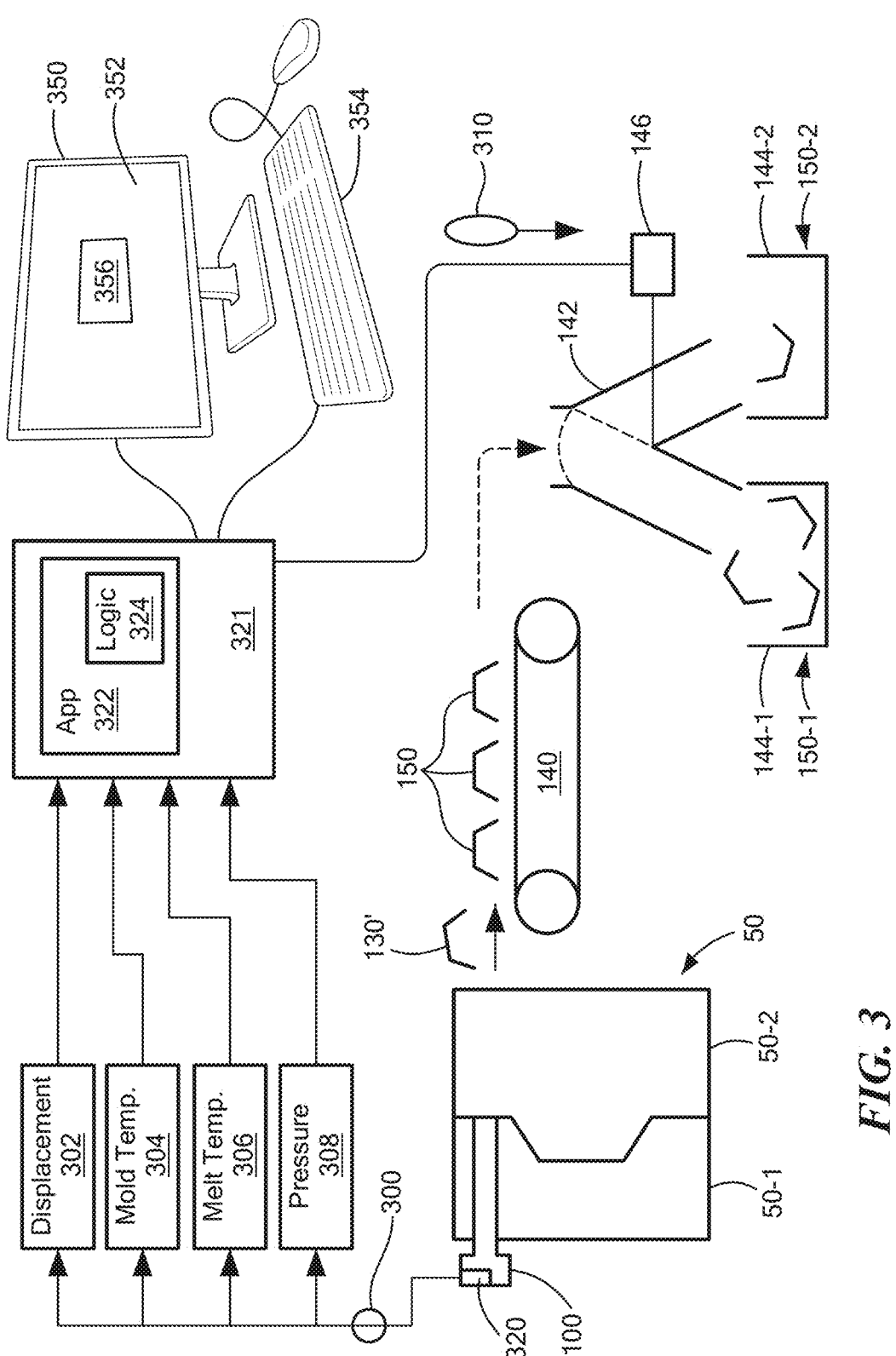
FIG. 3 is a schematic diagram of a control application operative with the multivariate shrinkage sensor (MVSS) of FIGS. 2A-2D.

FIG. 3 is a schematic diagram of a control application operative with the multivariate shrinkage sensor (MVSS) of FIGS. 2A-2D. Referring to FIGS. 1-3, in the production environment 10, large quantities of molded articles 150 result from the mold 50 once the cured, molded article 130' is ejected from the mold 50. These typically follow an evaluation and/or sorting process for validation as to whether each molded article 150 is sufficient. For example, a conveyor 140 may transport the molded articles 150 to a sorting apparatus 142. The sorting apparatus employs a diverter or selector driven from an actuator 146 to divert the molded articles 150 to different bins 144-1 . . . 144-2 (144 generally) for containing acceptable moldings 150-1 and unacceptable moldings 150-2. Other suitable sorting and manufacturing apparatus may be employed. In contrast, conventional approaches typically store unsorted batches of the articles for subsequent testing an analysis.

Configurations herein employ signals 300 from the in-mold sensor element 100 for expedited or immediate evaluation. The sensor element 100 computes signals 300 by an analysis circuit 320 responsive to the position sensor 100 for receiving a displacement signal 302. The displacement signal 302 is indicative of a distance traveled by the plunger 110 during an injection stage for filling the mold 50 and a cooling stage defined by a contraction of a molded material 112 in the filled mold.

The analysis circuit 320 may communicate with a molding quality application 322 having logic 324 for computing whether the corresponding molded article 150 is acceptable, and sends a validation signal 310 to the actuator 146. The sensor element 100 may also include additional sensors for generating signals pertaining to a mold temperature 304, a melt temperature 306, and a molding pressure 308, discussed further below in FIG. 4.

The analysis circuit 320 may be encoded on a PCB (Printed Circuit Board) disposed adjacent to the proximate end of the elongated plunger for heat dissipation, such that the analysis circuit is integrated or electrically connected to the position sensor 122 for generating the displacement signal 302. The analysis circuit may also receive sensor data for one or more of the pressure signal 308 indicative of a fluidic pressure of the injected melt, the melt temperature signal 306 indicative of a temperature of the injected melt and the mold temperature signal 304 indicative of a temperature of the mold 50 resulting from the injected melt 112. An adjacent computing system 321 launches and executes the application 322 for generating the validation 310.

The analysis circuit 320 couples to the molding quality application 322 which is configured to generate the validation signal 310 indicative of whether the molded article 150 resulting from the cooled melt is sufficient for use based on the displacement signal 302 and at least one of the pressure signal 308, the melt temperature signal 306 and the mold temperature signal 304. The molding quality application may also employ a graphical user interface 352 (GUI) visible on a rendering device 350 responsive to a user interface 354 such as a keyboard and mouse. The GUI 352 may render and receive control parameters 356 concerning the quality and control parameters of the molded article 150, discussed further below. In general, the analysis circuit 320 is disposed on the sensor element 100 for receiving raw signal data such as voltage signals from the sensors, and the analysis application 322 is at a remote PC or user computing device for receiving the displacement, pressure, mold temperature and melt temperature, but any suitable mode of communication between the analysis circuit 320 and analysis application 322 may be envisioned.

A paramount consideration in the quality of the molded article is the finished dimensions of the molded part after shrinkage is concerned. Accordingly, the quality application is configured to compute a finished size of the molded article based on a shrinkage computed from the displacement signal. Shrinkage is determined from the displacement signal as the melt cools and contracts, but overall quality is also affected by a pressure, volume and temperature (PvT) relationship of the injected melt flowing through the cavities and geometry of the mold. In general, the ressure-volume-temperature relationship provides the post-mold shrinkage.

post-mold shrinkage is the shrinkage occurs when ejected part cools down to the room temperature from the ejection temperature. Interior mold dimension, such as narrowness of channels through which the high-pressure melt is forced, all play a role. Accordingly, the quality application is further configured to compute the validation signal based on a pressure-volume-temperature (PvT) relation for correlating a viscosity and a rate of introduction (velocity) of the melt into the cavity. In analyzing the quality of the melt and molded article, viscosity and velocity provide the thorough process monitoring and control of the plastics part fabrication process. In this context, the fabrication process may be subject to other plastics manufacturing processes including injection molding.

Figure 4:
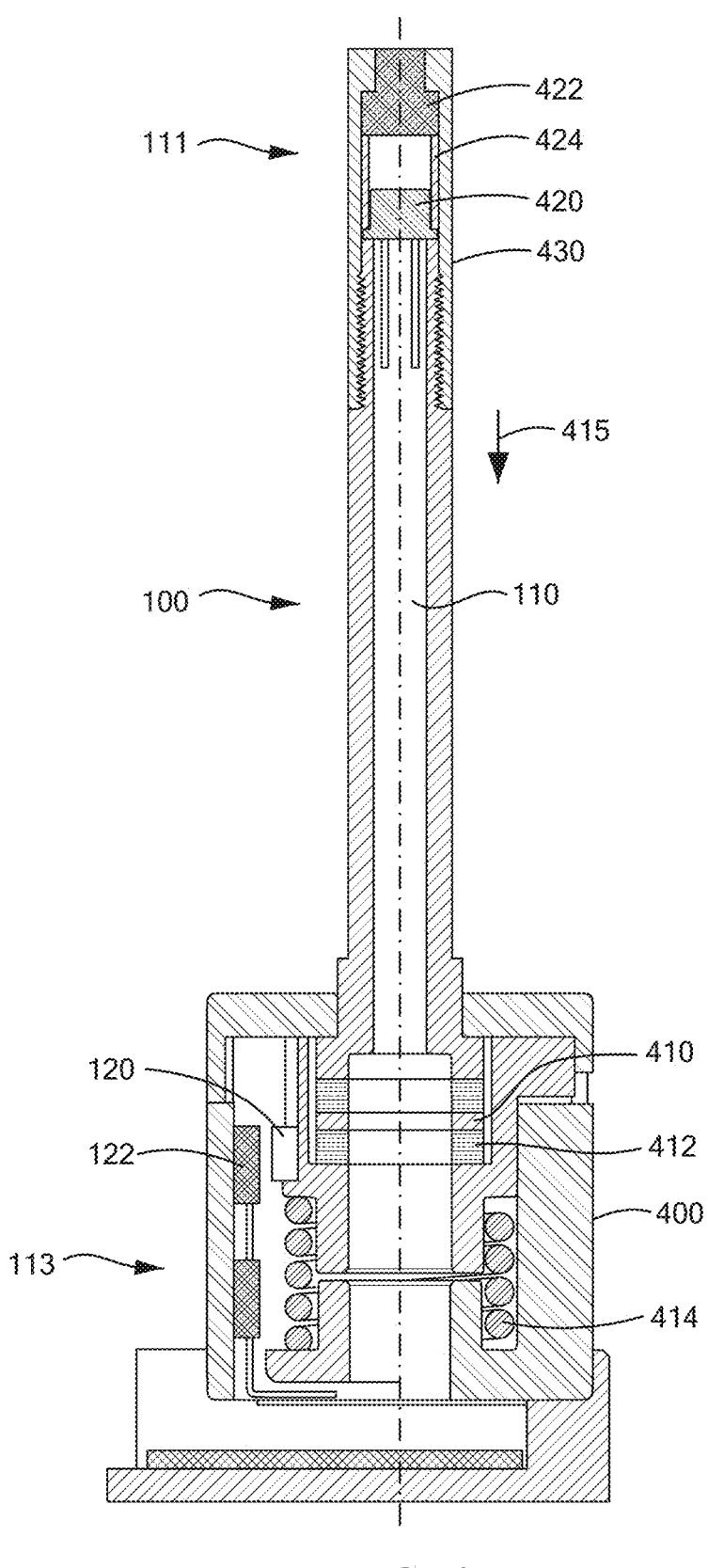
FIG. 4 is a side cutaway view of the MVSS of FIGS. 2 and 3.

FIG. 4 is a side cutaway view of the MVSS of FIGS. 2 and 3 showing the signal generation in more detail. Referring to FIGS. 1-4, the sensor element 100 further include a pressure sensor 410 embedded in the elongated plunger 110, such that the elongated plunger 110 is in slidable communication with a housing 400 for advancing and retracting from the mold 50 based on a pressure exerted from the fluidic melt 130 in the cavity 112.

The pressure sensor 410 is defined by a piezoelectric element disposed in a linear interference communication with the proximate 113 and distal 111 ends of the elongated plunger 110. The piezoelectric element is disposed for receiving a compression force between the biasing force from a spring 414 and an opposed force 415 from an injected melt 130. In the example arrangement, the biasing force 414 includes a spring disposed for advancing the elongated plunger 110 into the cavity 112. The pressure exerted from the fluidic melt 130 acting against the biasing force induces a compression in the elongated plunger 110. The piezoelectric element is flanked by insulating washers 412, and generates the pressure signal based on a piezoelectric response based on the compression. Alternate configurations may include an alternate sensing medium such as a strain gauge, capacitive or bi-metallic-based displacement transducer medium.

A temperature sensor 420 is disposed in the distal end 111 of the elongated plunger 110, such that the temperature sensor emits a melt temperature signal 306 based on a temperature of the injected melt 112. The temperature sensor further includes an infrared lens 422 for passing radiated energy to the temperature sensor 420, as the temperature sensor responsive to the radiated energy for generating the melt temperature signal 306. For example, the melt temperature sensor 420 may include a thermopile 424, spacer and a zinc selenide lens as the filter 422.

Figure 6B:
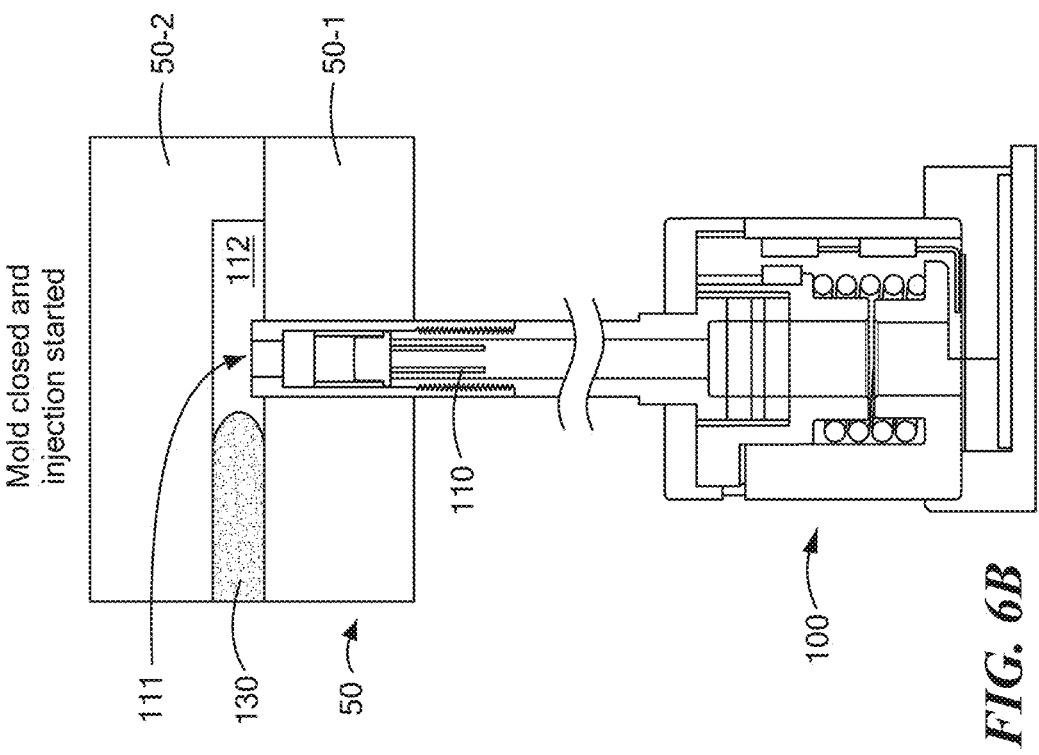
FIGS. 6A-6F show the MVSS sensor of FIG. 4 used for controlling a molding operation.

The distal end 111 also includes a resistive sensor 430 such as a thermistor or thermocouple in the elongated plunger 110 for generating the mold temperature signal 304 based on a temperature of the mold as the injected melt 112 fills the cavity. Recall that the temperature of the melt 112 is a significant factor in flow and curing of the melt, and generally the heat in the melt transfers to the mold 50 as the melt 112 is injected and cools/cures. Tracking the melt temperature and mold temperature based on the respective signals 306, 304 will be discussed further below in FIG. 6F.

In a particular configuration, the thermopile 424 is disposed for receiving emitted infrared energy indicative of a temperature of the melt, such that the thermopile includes a thermistor for conductive sensing of a temperature of the mold. Alternatively, a thermocouple or other resistive based sensor may be employed for contact based sensing of either the melt or the mold.

Returning to the position sensor 122, a Hall effect sensor may be employed for generating the displacement signal 302 as the magnet 120, attached to the elongated plunger 110, moves towards the mold 50 prior to injection, is forced back during injection, and finally moves again towards the mold 50 as the cooling melt 112 shrinks.

The sensor element 100 may be implemented in any suitable manner for providing the displacement 302, mold temp. 304, melt temp. 306 and pressure 308 signals, however a particular configuration is as follows. The pressure sensing 410 and in-mold shrinkage measurement 122 sensors are placed within the sensor housing 400 of 23 mm outer diameter. The sensor housing assembly is placed over the sensor base of 25 mm outer diameter with six countersunk screws to form the sensor body. The sensor base component provides the space for the wires and integrated electronics including the analysis circuit 320. For in-mold shrinkage sensing, the position sensor 122 and magnet 120 are placed within the slot of the sensor housing, and PZT (Piezoelectric) housing components, respectively. The position sensor and magnet remain facing each other during the sensor operation, while the position sensor remains stationary during the operation. For a pressure sensing, the PZT ring and insulation washer assembly sit inside the PZT housing, where PZT housing sits over the compression spring. The PZT housing with PZT ring, washers, and magnet and compression spring stay within the sensor housing component with the position sensor. There is a clearance of 0.025 mm between the PZT housing OD and sensor housing ID for the smooth sliding of the PZT housing.

The temperature sensing system (thermopile and ZnSe window) is placed within the elongated plunger 110 defining the temperature sensor pin, which is inline with the sensor headpin as part of the entire elongated plunger 110. Alternatively, other crystals, gems and/or crystalline stones may be employed as a window which can transmit the light in addition to ZnSe. For example, sapphire, ruby or topaz, may be employed, based on factors such as cost, durability or temperature compatibility.

The sensor headpin replicates the standard 6 mm ejector pin. The length of the sensor headpin can be customized depending on the mold height by changing the length of the pressure sensor pin.

The head of the sensor headpin remains in contact with the top surface of the PZT insulation washer, which will transfer the force to the PZT ring and compression spring. A sensor cover is installed over to the sensor housing using countersunk screws to encapsulate the head of the sensor headpin, PZT housing assembly, and partially compressed spring inside the sensor housing. The sensor housing 400 provides a mechanical stop for the PZT housing beyond 0.5 mm displacement, which in turn will control the sensor headpin travel. The selected compression spring will fully compress at a pressure higher than 5 MPa and regain its free length once the pressure decays below 5 MPa. Other suitable pressure and displacement thresholds may also be employed, and various lips and shelves may be provided to limit travel of the elongated plunger to a predetermined travel, such as 0.5 mm.

Figure 5:
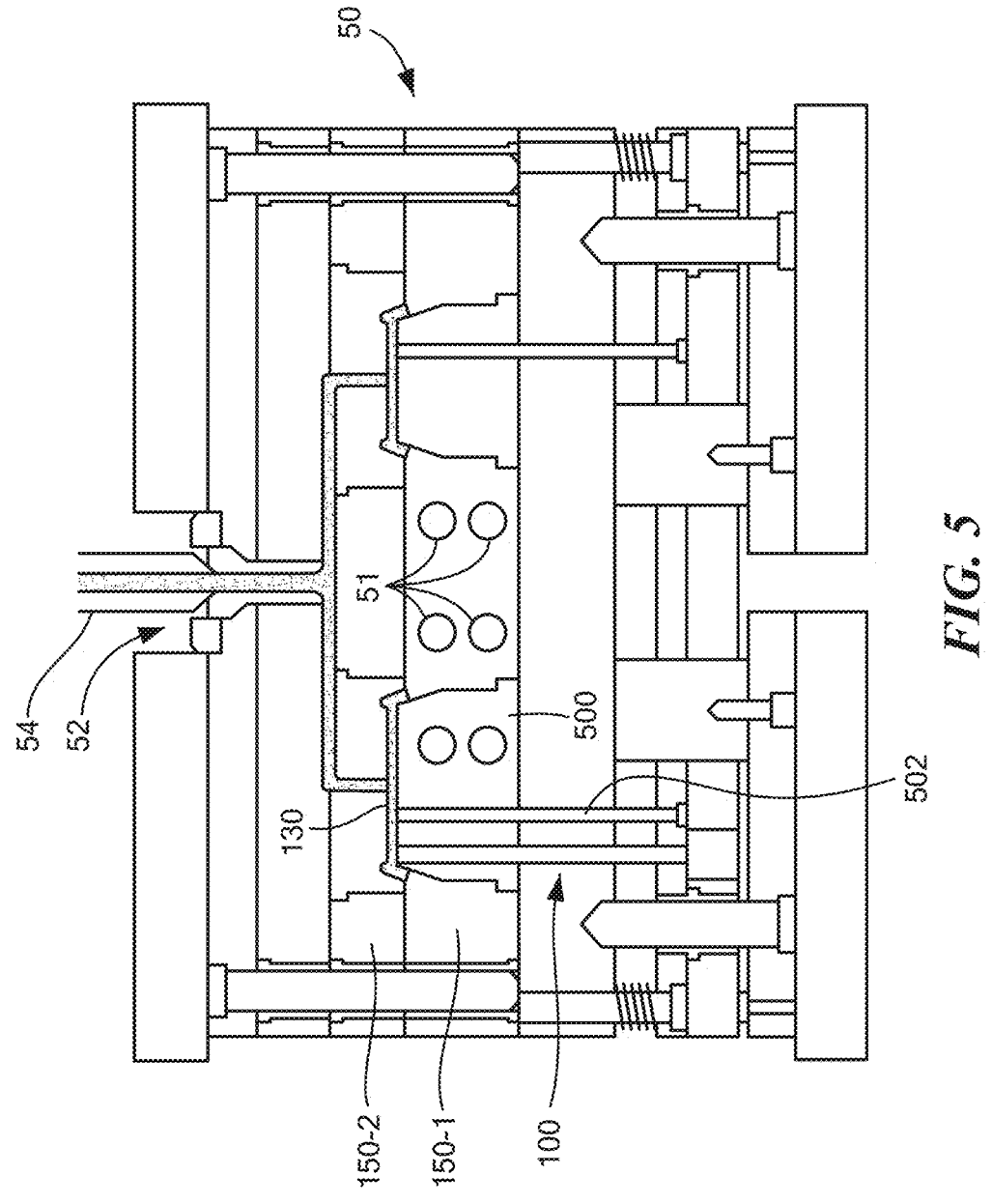
FIG. 5 shows the MVSS installed in a molding apparatus operable with the configurations of FIGS. 1-4.

FIG. 5 shows the MVSS installed in a molding apparatus operable with the configurations of FIGS. 1-4. In the example molding apparatus, the mold 50 is filled by the injector 54 engaged with the injection interface 52. The sensor element 100 occupies a cavity insert 500 which may also be employed for an ejection pin 502 used to eject the molded article 150, and is a common fixture on a typical mold 50. This conveniently disposes the sensor element 100 away from the cooling lines 51, injection nozzles 54 and other hydraulics and actuated components of the mold 50, so as not to interfere with the molding process.

Because of the ejector pin style of the sensor headpin, the mold 50 will employ a standard straight 6 mm hole within the B-side cavity plate 150-1 that will eliminate the risk of space constraints, complex mold construction, and failure during the sensor element 100 installation and maintenance. The sensor body will stay within the ejector system. Hence, the mold design and complexity are drastically reduced, especially for multicavity molds. Also, the mold design will still keep the flexibility of efficient cooling system design even for smaller parts and multi-cavity molds be leaving cooling passages 51 unimpeded. Preferably metal components are fabricated from 316L stainless steel, except pressure sensor pin and temperature sensor pin. These two pins are made from hardened steel (H13) with 55 HRC hardness so they can sustain continuous wear and tear for over a million molding cycles as well as protect the temperature sensing system. All steel components expect tight tolerances to ensure proper function and robust operation of the sensor in the high heat and pressure experienced by the melt 130.

FIGS. 6A-6F show the MVSS sensor (sensor element) 100 of FIG. 4 used for controlling a molding operation. In polymer injection molding, the molding machine 20 melts solid plastics pellets into the hot melt 130, and injects the hot melt into the mold cavities to fill the cavity 112. As soon as the plastic melt enters the mold, it begins to cool down due to the mold cooling system and starts to solidify. Within the mold cavity, plastics material experiences the "in-mold shrinkage" during solidification. Because of the in-mold shrinkage, the part becomes smaller than the mold cavity. The most commonly used plastics materials in the molding application exhibit a shrinkage rate from 0.005 to 0.1 mm/mm, which is high relative to the dimensional tolerances of many molded parts.

Figure 6A:
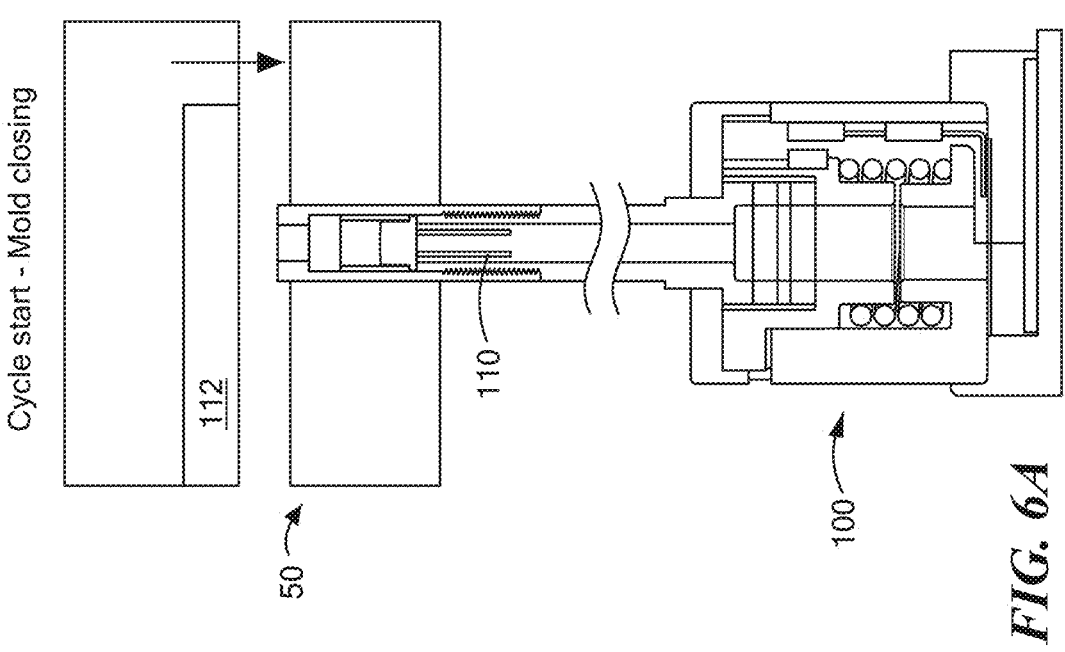
Figures 6C, 6D:
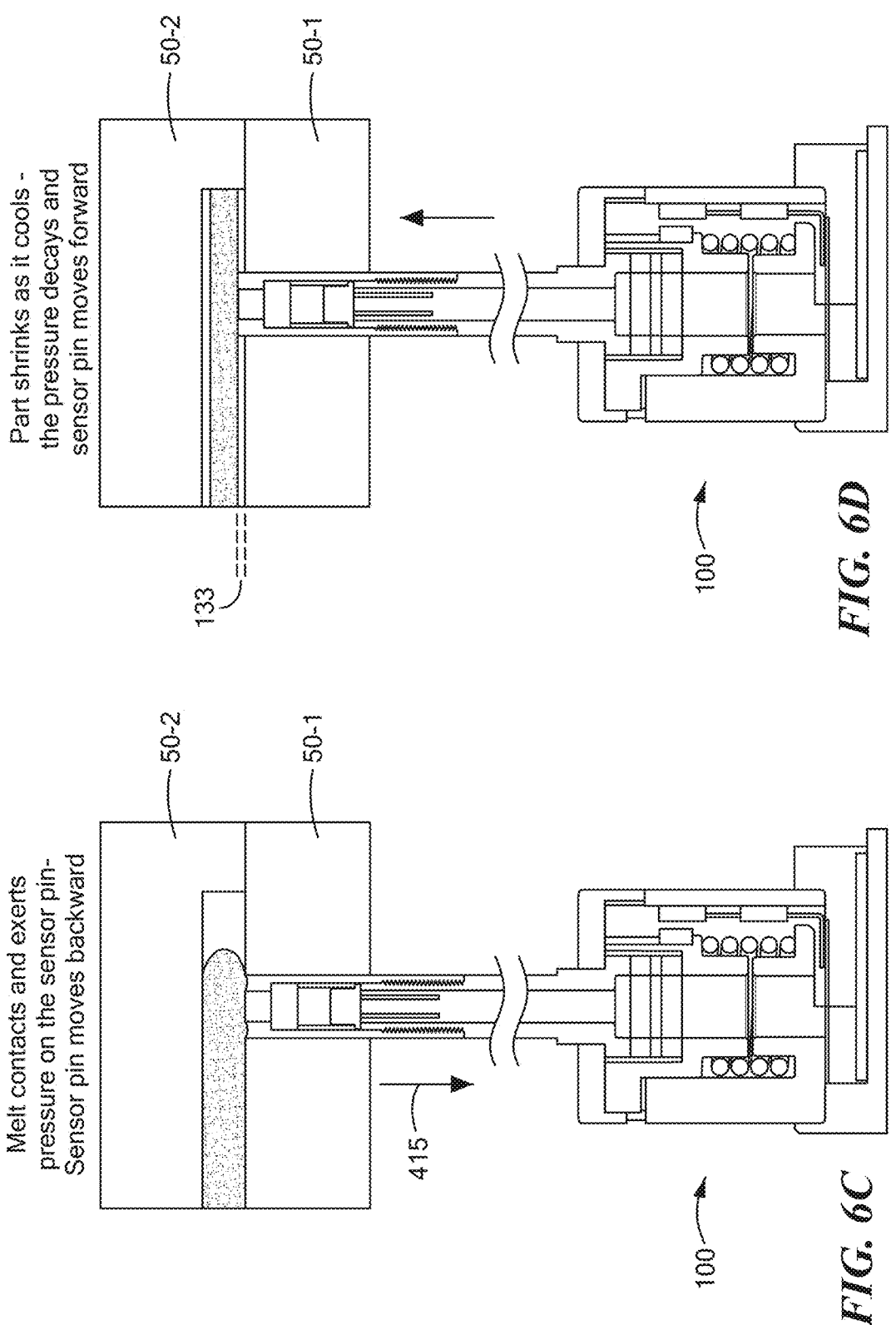
Figure 6E:
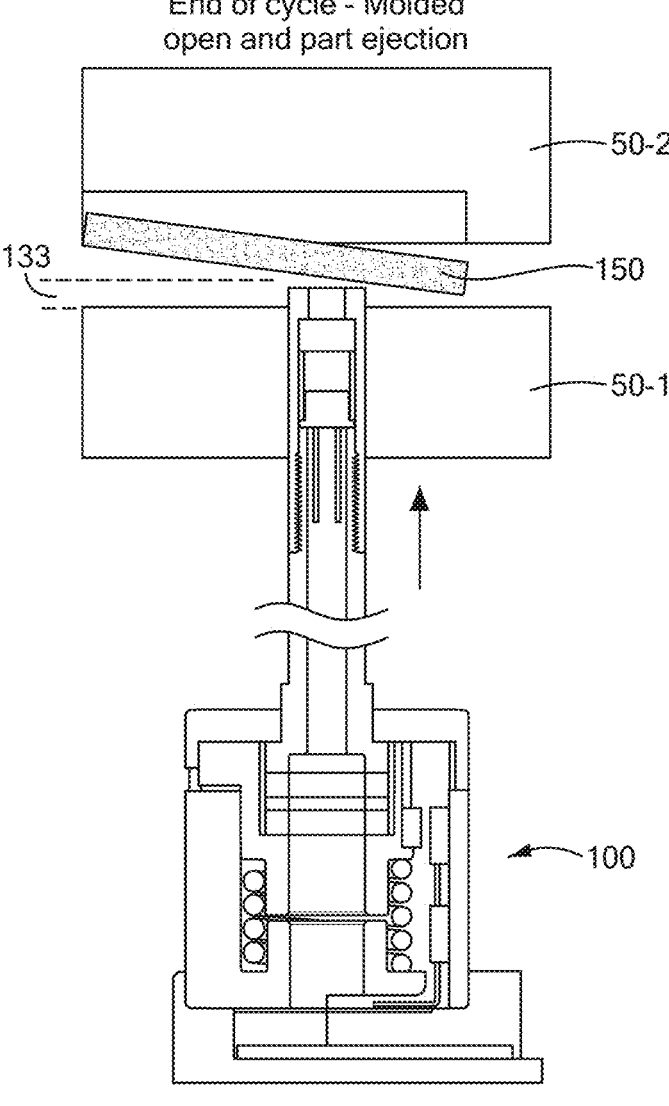
Figure 6F:
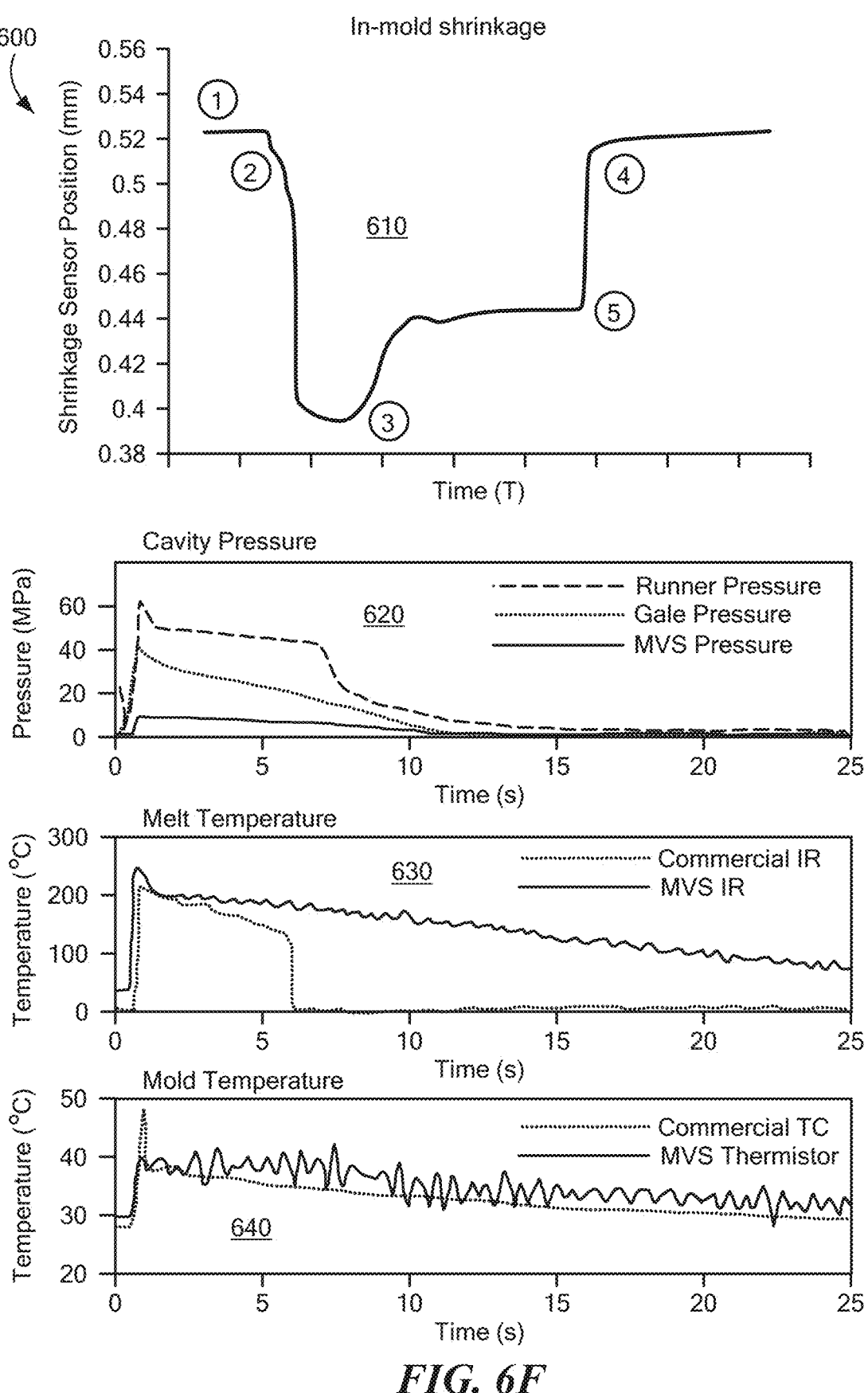

Referring to FIGS. 1-6F, the molding process for a molded article 150 commences with the sensor element 100 extending the elongated plunger 110 into the cavity 122, as biased by the spring and ledges limiting travel to within a predetermined threshold, such as 0.5 mm, shown in FIG. 6A. It should be noted that the elongated plunger 110 refers collectively to the slidable aggregation including the mold and melt temperature sensors, the piezoelectric pressure sensor and the magnetic source that all travel as a single unit as they are displaced in and out of the mold.

In FIG. 6B, the melt 130 flows into the cavity in a high pressure, high temperature molten state as the elongated plunger 110 extends 0.5 mm from the distal end 111. The mold 50 has a passage for insertion of the elongated plunger, either via an insert for the ejection pin or a dedicated port or opening. The elongated plunger 110 has a range of travel between a flush position and a fill position, such that the fill position is defined by the distal end 111 of the elongated plunger extending into the cavity 112. The flush position is defined by the distal end of the elongated plunger flush with a surface of the cavity 112, and the range of travel is based on a degree of shrinkage expected in a molded article. In the disclosed approach, this displacement distance is 0.5 mm, however any suitable predetermined range may be employed. The distal end of the elongated plunger defines a sensor headpin that will remain protruded until the polymer melt 130 comes in contact with the top surface of the ZnSe window (infrared filter 422) at the distal end.

In FIG. 6C, the melt 130 fills the void 112 and the pressure pushes the elongated plunger 110 from the fill position (extending 0.5 mm) back to a flush position with the mold cavity surface, being forced against the biasing element. Once the melt pressure acting on the sensor headpin reaches above 5 MPa, it will push the sensor headpin back while transferring he pressure force to the PZT ring 410. Due to the mechanical stop on the sensor housing, the pin will stop moving after 0.5 mm displacement. At this time, the elongated plunger flushes with the mold cavity surface and continues to transfer the pressure to the PZT ring. Hence, the PZT ring will provide the output signals corresponding to the pressure acting on the sensor headpin. The Hall effect position sensor monitors and measures the sensor headpin travel and position. In FIG. 6D, during the cooling stage of the molding cycle, the polymer melt 130 cools down and starts to separate away from the mold cavity walls due to the shrinkage. Thus, the pressure acting on the elongated plunger will continue to decay. The distal end of the elongated plunger 110 will remain flush with the mold cavity surface until the pressure acting on the sensor headpin reaches below 5 MPa.

At a pressure below 5 Mpa, the sensor headpin will begin to move upward due to the spring force, depicted in FIG. 6E. The Hall-effect position sensor monitors and measures the sensor headpin's upward motion in the displacement signal 302. At the end of the molding cycle in FIG. 6E, the mold 50 opens and ejects the molded article 150 out of the mold 50. After the mold opening, there is no force acting on the sensor headpin. Hence the sensor headpin will move forward to its start position and protrude 0.5 mm inside the cavity. The difference between the position sensor's output from flush in FIG. 6C to advanced in FIG. 6D indicates the magnitude of the "in-mold shrinkage" 133 the polymer experienced during the molding cycle. Throughout the molding cycle, the thermopile within the temperature sensing system continuously monitors and measures the melt temperature and mold temperature, shown in FIG. 6F. The GUI 352 displays these control parameters as graphs 600 along a time axis. A shrinkage graph 610 shows movement of the elongated plunger at the respective stages of FIGS. 6A-6E. The cavity pressure graph 620 shows that after peaking during injection, drops along with the shrinkage. Melt and mold temperatures 630, 640 respectively, decline along with temperature and pressure. The melt and mold temperatures can be used to estimate the post-mold shrinkage using a coefficient of linear thermal expansion (CLTE) of the polymer or advanced pressure-volume-temperature (PvT) relationship.

In the example configuration, the raw sensory data is generally based on an electrical voltage or current emanating from the respective sensory elements. In general, output voltage responses are obtained for the position sensor, melt pressure, melt temperature, and mold temperatures. The voltage responses are converted into the absolute in-mold shrinkage, pressure, and temperatures.

The Hall effect position sensor may be, in an example configuration, sourced from Melexis Technologies NV (MLX90364) and gives the voltage corresponding to its position against the Neodymium magnet (square share 3.2 mm, 1.6 mm thick). The position sensor is calibrated for the maximum allowable sensor pin travel of (0.5 mm). The selected position sensor can give analog and digital signals, but for the implemented MVSS, analog signals were used and converted into an absolute position reflected by the displacement signal 302. As mentioned earlier, the difference between the position sensor signal at melt contact with a full mold and the end of the cooling provides the in-mold shrinkage 133.

In the analysis circuit 320, for the pressure signal 308, as polymer melt flows across the MVSS sensor headpin, as shown in FIG. 4, the pressure exerted on the lens, will be transferred onto the PZT, which will cause the accumulation of charge. The voltage response from the PZT ring 412, VPZT, is described in the following equation:

$$V_{PZT} = \frac{4 * g_{33} * P * H * R^2}{OD^2 - ID^2}$$

where g33 is the voltage constant determined by the PZT material, H is the ring thickness of 1 mm, ID is the ring inner diameter of 6 mm, OD is the ring outer diameter of 10 mm, and R is the temperature senor pin radius of 3.0 mm. For the design shown above, with H equal to 1 mm and a voltage constant, g33 of to 24.8×10–3 Vm/N for APC-850 material, the voltage response will be 14 V/MPa of melt pressure. The sensor pin remains flushed to the surface of the cavity until the cavity melt pressure decays to 5 MPa that prevents any loss or abnormalities in the pressure reading that would occur from a gap between the cavity and sensor.

As the polymer melt flows across the sensor window, the melt temperature signal 306 is derived as infrared radiation (IR) passes through the zinc selenide (ZnSe) window and is collected by the thermopile (TP). The voltage response of the TP, VTP is described by the equation:

$$T_{melt} = \left( \frac{V_{TP}}{k * \varepsilon} + T_{mold}^n \right)^{1/n}$$

where k is the gain, ε is the emissivity of the polymer, T melt, and Tmold are the temperatures of the melt and the mold, respectively, and n is dependent on the filter and sensor characteristics (equal to 4 for a perfect "black" body and unlimited wavelength range).

For computing the mold temperature signal 304, the thermopile contains a thermistor to assess the reference temperature of the CMOS IR detector, which must be known to compute the net radiative heat transfer to the thermopile. A 100 kOhm thermistor resistance is supplied from the manufacturer as a function of temperature to within 0.2% absolute error. A voltage divider circuit converts the thermistor's output resistance to a voltage. The value of the reference resistor (10 kOhm) was selected to scale the output voltage to the desired range while also linearizing the thermistor output within the mold coolant temperatures of interest, from 25° C. to 100° C.

In operation, a system according to FIG. 3 employs the application 322 and logic 324 for receiving the signals 302, 304, 306 and 308 from the analysis circuit 320 for performing s method of validating an injection molded article 150 resulting from injection of a melt 130 into a mold 50. Validating includes extending the elongated plunger 110 into a cavity 112 defined by an interior volume of the mold 50, in which the elongated plunger 110 has a distal end 111 in communication with the cavity and a proximate end 113 responsive to a biasing force. An injector 54 injecting a melt defined by a molding substance into the cavity via a fluidic interface 52, which retracts the elongated plunger back from the cavity responsive to a pressure of the injected melt, such that the pressure of the injected melt is detected by a pressure sensor on the elongated plunger. An application measures the detected pressure from the pressure sensor when the elongated plunger retracts such that the distal end is flush with an interior surface of the mold, and measures a displacement distance based on the position signal when the detected pressure abates for indicating a cooled melt in the cavity and a corresponding movement or displacement of the elongated plunger back into the cavity.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. An injection molding quality sensing device, comprising:

an elongated plunger in communication with a cavity defined by an interior volume of a mold, the elongated plunger having a distal end in communication with the cavity and a proximate end responsive to a biasing force;

a magnetic source attached to the proximate end; and a position sensor responsive to the magnetic source for detecting a movement of the plunger based on displacement of the distal end from shrinkage of an injected melt contained in the cavity; and generating a displacement signal indicative of the shrinkage;

a temperature sensor disposed in the distal end of the elongated plunger, the temperature sensor having an infrared lens for passing radiated energy frim the melt for generating a melt temperature signal based on a temperature of the injected melt; and an analysis circuit configured to generate a validation signal based on the displacement signal and the melt temperature signal.

2. The device of claim 1, wherein the displacement signal is indicative of a distance traveled by the plunger during an injection stage for filling the mold and a cooling stage defined by a contraction of a molded material in the filled mold.

3. The device of claim 1, further comprising a mold, the mold having a passage for insertion of the elongated plunger, the elongated plunger having a range of travel between a flush position and a fill position;

the fill position defined by the distal end of the elongated plunger extending into the cavity;

the flush position defined by the distal end of the elongated plunger flush with a surface of the cavity; and the range of travel based on a degree of shrinkage expected in a molded article.

4. The device of claim 1, further comprising an injection interface in fluidic communication with the mold, the injection interface responsive to an injector for receiving a melt, the melt for filling the cavity for forming a molded article defined by an interior contour of the mold.

5. The device of claim 1, further comprising a pressure sensor embedded in the elongated plunger, the elongated plunger in slidable communication with a housing for advancing and retracting from the mold based on a pressure exerted from a fluidic melt in the cavity.

6. The device of claim 5, wherein the biasing force includes a spring disposed for advancing the elongated plunger into the cavity, the pressure exerted from the fluidic melt acting against the biasing force for inducing a compression in the elongated plunger, the pressure sensor exhibiting a pressure signal based on the compression.

7. The device of claim 5, wherein the pressure sensor is a piezoelectric element disposed in a linear interference communication with the proximate and distal ends of the elongated plunger, the piezoelectric element disposed for receiving a compression force between the biasing force and an opposed force from an injected melt.

8. The device of claim 5, wherein the pressure sensor includes at least one of a strain gauge, capacitive or bi-metallic based displacement transducer medium.

9. The device of claim 1, further comprising a resistive sensor in the elongated plunger, the resistive sensor for generating a mold temperature signal based on a temperature of the mold as the injected melt fills the cavity.

10. The device of claim 1, wherein the temperature sensor further comprises a thermopile disposed for receiving emitted infrared energy indicative of a temperature of the melt, the thermopile including a thermistor for conductive sensing of a temperature of the mold.

11. The device of claim 1, wherein the magnetic sensor is a Hall effect sensor, the pressure sensor is a piezoelectric sensor, the melt temperature sensor includes a thermopile and a zinc selenide lens, and the mold temperature sensor is a thermistor.

12. The device of claim 2, wherein the analysis circuit is disposed adjacent to the proximate end of the elongated plunger for heat dissipation, the analysis circuit electrically connected to the position sensor for receiving the displacement signal and one or more of:

a pressure signal indicative of a fluidic pressure of the injected melt;

the melt temperature signal indicative of a temperature of the injected melt; and a mold temperature signal indicative of a temperature of the mold resulting from the injected melt.

13. The device of claim 12, further comprising an interface to a quality application configured to generate the validation signal indicative of whether the molded article resulting from the cooled melt is sufficient for use based on the displacement signal and at least one of the pressure signal, the melt temperature signal and the mold temperature signal.

14. The device of claim 13, wherein the quality application is configured to compute a finished size of the molded article based on a shrinkage computed from the displacement signal.

15. The device of claim 14, wherein the quality application is further configured to compute the validation signal based on a pressure-volume-temperature (PyT) relation for correlating a viscosity and a rate of introduction of the melt into the cavity.

16. A method of validating an injection molded article resulting from injection of a melt into a mold, comprising:

extending an elongated plunger into cavity defined by an interior volume of a mold, the elongated plunger having a distal end in communication with the cavity and a proximate end responsive to a biasing force;

injecting a melt defined by a molding substance into the cavity via a fluidic interface;

retracting the elongated plunger back from the cavity responsive to a pressure of the injected melt, the pressure of the injected melt detected by a pressure sensor on the elongated plunger;

measuring the detected pressure from the pressure sensor when the elongated plunger retracts such that the distal end is flush with an interior surface of the mold; and measuring a displacement distance based on the position signal when the detected pressure abates for indicating a cooled melt in the cavity;

measuring a melt temperature from a temperature sensor disposed in the distal end of the elongated plunger, the temperature sensor having an infrared lens for passing radiated energy frim the melt based on a temperature of the injected melt; and generating a validation signal indicative of a quality of the molded article based on the detected pressure, the displacement distance and the melt temperature.

17. The method of claim 16, further comprising extending the elongated plunger into the mold, the mold having a passage for insertion of the elongated plunger, the elongated plunger having a range of travel between a flush position and a fill position;

the fill position defined by the distal end of the elongated plunger extending into the cavity;

the flush position defined by the distal end of the elongated plunger flush with a surface of the cavity; and the range of travel based on a degree of shrinkage expected in a molded article.

\* \* \* \* \*